United States Patent [19]

Saso

[11] 4,207,703
[45] Jun. 17, 1980

[54] GAME CALL

[76] Inventor: Michael Saso, Wingsetter Game Calls, P.O. Box 6143, Modesto, Calif. 95355

[21] Appl. No.: 923,209

[22] Filed: Jul. 10, 1978

[51] Int. Cl.² ............................................. A63H 5/00
[52] U.S. Cl. ........................................ 46/177; 46/178
[58] Field of Search .................. 46/177, 178, 179, 181, 46/180; 84/83, 90

[56] References Cited

U.S. PATENT DOCUMENTS

| | | | |
|---|---|---|---|
| 394,243 | 12/1888 | Briggs | 46/179 |
| 396,821 | 1/1889 | Johnson | 46/179 |
| 500,433 | 6/1893 | Schubert | 46/179 |
| 603,555 | 5/1898 | Davis | 46/179 |
| 931,286 | 8/1909 | Einicke | 46/178 |
| 1,311,690 | 7/1919 | Hakius | 46/179 |
| 2,782,557 | 2/1957 | Harley | 46/180 |
| 2,972,834 | 2/1961 | Bacon | 46/179 |
| 3,029,554 | 4/1962 | Mobley | 46/179 |
| 3,802,120 | 4/1974 | Erhart | 46/181 |
| 4,054,134 | 10/1977 | Kritzer | 46/180 |

*Primary Examiner*—Louis G. Mancene
*Assistant Examiner*—Michael J. Foycik, Jr.
*Attorney, Agent, or Firm*—Shlesinger, Arkwright, Garvey & Dinsmore

[57] ABSTRACT

A game call or the like whistle which includes a housing member with a mouthpiece and two air chambers with one of the air chambers having a constant volume and the other air chamber having a variable volume containing therein a piston arm for changing the volume of the variable chamber. The game call is formed by the cooperation of a top portion and a bottom portion which when placed together form the two air chambers and mouthpiece with a common wall separating the two chambers.

22 Claims, 4 Drawing Figures

GAME CALL

BACKGROUND AND FIELD OF THE INVENTION

The present invention pertains to a game call or the like whistle for imitating the sounds of pintails, quail and other fowl.

To be of greatest utility, a game call device should be constructed so as to allow the user to quickly, easily and accurately imitate the sounds of a variety of birds while requiring a minimum amount of adjustment for creating this variability. Game call devices of the prior art have generally been of two basic types—reeded fowl calls and non-reeded whistle bird calls. A game call device such as that disclosed by Erhart in U.S. Pat. No. 3,802,120 is typical of the reeded game calls. Attempts have been made to create a call device capable of imitating the sounds of a variety of different birds. One such method, as disclosed by Mobly in U.S. Pat. No. 3,029,554, has been to combine into one device a reeded and a non-reeded caller. Further attempts to increase the variability of a game call have included a whistle with one chamber which is variable by the movement of a piston arm, as shown by U.S. Pat. No. 603,555 to Davis. Other types of whistles of the prior relating to the general subject matter of whistles are typified by U.S. Pat. Nos. 1,094,006 and 396,821. None of these prior art devices however provides a game call which is sufficiently easy to manufacture and use and is capable of accurately imitating the sounds of a variety of different birds.

OBJECTS AND SUMMARY

It is therefore one object of the present invention to provide a game call or the like whistle which will accurately imitate the sounds of a variety of birds including those of pintails, widgeons, teals and quail.

It is another object of the present invention to provide a game call or the like whistle which by quick and easy adjustment will accurately imitate the sounds of a variety of different birds.

A further object of the present invention is to provide a game call or the like whistle which is easily manufactured in basically two portions with simple insert parts.

Yet another object of the present invention is to provide a game call or the like whistle which is easily manufactured with an accuracy to provide air chambers of the precise required size for imitating the sounds of specific game birds.

Still another object of the present invention is to provide a game call or the like whistle which contains one constant volume air chamber and one variable volume air chamber for creating the proper tones needed for imitating a variety of particular game birds.

A still further object of the present invention is to provide a game call or the like whistle which will accurately imitate bird sounds in both wet and dry conditions.

These and further objects of the present invention are accomplished by a game call or the like whistle comprising a housing with a mouthpiece and two air chambers with one of the air chambers having a constant volume and the other air chamber having a variable volume and containing therein a piston arm for changing the volume of the variable chamber. The game call is formed by the cooperation of a top portion and a bottom portion which when placed together form the two air chambers and mouthpiece with a common wall separating the two chambers.

DETAILED DESCRIPTION OF THE INVENTION

Figure 1:
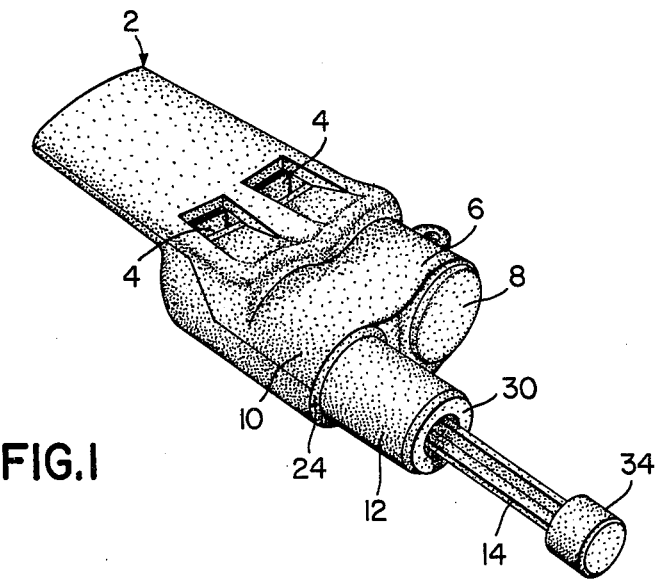
FIG. 1 is a perspective view of the game call or whistle of the present invention.
Figure 2:
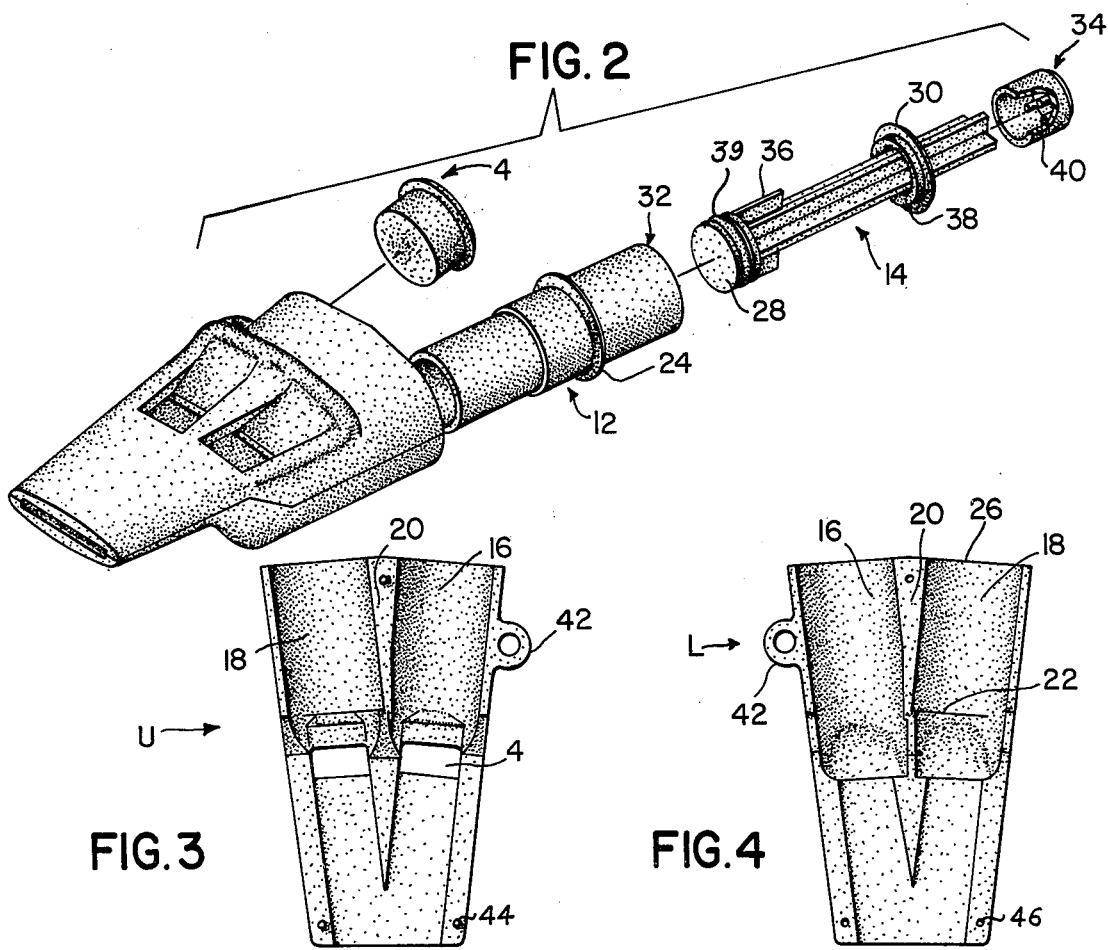
FIG. 2 is an exploded perspective view of the game call or whistle of the present invention with a cut-away view of the cap of the piston arm.

As shown in FIGS. 1 and 2, the game call of the present invention is a whistle which is generally comprised of a mouthpiece 2, venting means 4, a constant volume air chamber 6 covered by a cap 8, and a variable volume air chamber 10 containing a barrel 12 which holds a piston arm 14.

Figures 3, 4:
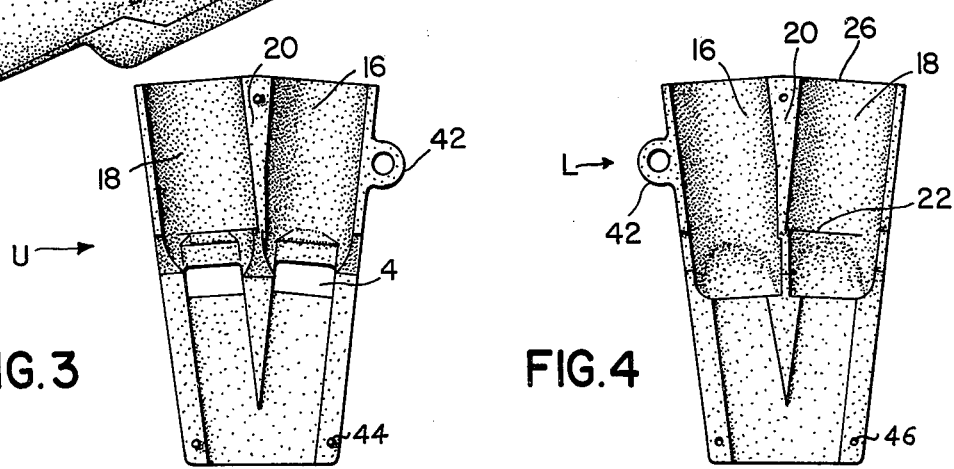
FIG. 3 is a bottom plan view of the upper portion of the game call or whistle of the present invention.
FIG. 4 is a top plan view of the lower portion of the game call or whistle of the present invention.

The mouthpiece 2 and air chambers 6 and 10 are formed by the cooperation of upper portion U (FIG. 3) and lower portion L (FIG. 4). Both portions U and L are provided with channels 16 and 18 which, placed in a top and bottom relationship form the constant volume 6 and variable volume 10 air chambers, respectively. So formed, the air chamber 6 and 10 are separated by a common wall 20 which is formed by the cooperation of the upper and lower parts of the common wall 20 contained in the upper and lower portions and extends partially into mouthpiece 2 to separate the mouthpiece 2 into two separate passageways. This upper and lower portion construction of the present invention resulting in forming adjacent air chambers separated by a common wall, rather than two distinct and separate air chambers in a side by side relationship, creates a game call which more accurately imitates the desired bird sounds and which is substantially simpler to manufacture with greater precision than was attainable by any of the prior art devices.

To provide a game call with the desired tone ranges it is desirable to construct the game call with one chamber that is of a constant volume and a second chamber which is provided with a volume varying means which thereby varies the created tones. Therefore, in the present invention constant volume air chamber 6, formed by the upper and lower channel 16, is provided with a cap 8 which is constructed at a size which will create a chamber 6 of the precise volume desired. To create a variable volume chamber, chamber 10, formed by the upper and lower channels 18, is provided with a hollow barrel 12 which holds piston arm 14 which by sliding within barrel 12 varies the volume of chamber 10. In order to insure that variable chamber 10 will have the proper minimum and maximum volumes, lower channel 18 is provided with a lip 22 which prevents the further inward positioning of barrel 12, and barrel 12 is provided with a collar 24 which by abutting outer edges 26 of variable chamber 10 additionally prevents further inward positioning of barrel 12.

After barrel 12 is properly positioned in variable chamber 10, piston arm 14 is placed in barrel 12 with grooved bottom plate 28 at the lower end of barrel 12, ring 30 abutting upper edge 32 of barrel 12, and plunger arm 14 projecting outward terminating with cap 34. To maintain the proper range of positioning for piston arm 14, there is provided thereon a flange 36 which by abutting with the extended edge 38 of ring 30 prevents undesirable upward motion of the piston arm 14 and which by abutting with the inside of barrel 12 prevents undesirable wobble of the piston arm 14. Additionally, the cap 34 and piston arm 14 are manufactured at a proper size to prevent undesirable downward motion of the plunger arm 14 by the abutting of cap 34 with ring 30. The piston arm 14 is further provided at its grooved bottom plate 28 with a sealing means, such as O-ring 39, for preventing escape of air out of the variable air chamber 10 through the space between ring 30 and piston arm 14.

For insuring sufficient strength and durability, plunger arm 14 is most advantageously manufactured in the shape of two intersecting planes which fit between the pins 40 in cap 34 for preventing undesired rotational movement of arm 14 within cap 34. However, it is obvious that any shaped plunger arm and cap of sufficient strength and durability are suitable for the purposes of the present invention.

The game call of the present invention may additionally be provided with an attaching means 42 for accepting a cord or the like for securing the call to a person or object. Furthermore, upper portion U is provided with projections 44 which cooperate with depressions 46 in lower portion L and thereby aid in the proper alignment of the two portions during manufacture of the game call of the present invention.

In its use, the tones produced by the game call of the present invention may be varied by changing the volume of chamber 10 with piston arm 14 and/or by alternately restricting the air flow through vents 4. Because the sounds produced are dependent upon the volumes of the air chambers without the need of a reed or the like, the game call of the present invention can be made of a lightweight plastic and continuously accurately reproduce the calls of game birds without being undesirably affected by wear and weather conditions.

While this invention has been described as having a preferred design, it will be understood that is is capable of further modification. This application, is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:

1. A game call or the like whistle including:
   (a) a housing
   (b) said housing being formed to provide air chambers which extend longitudinally of said housing in side-by-side relationship
   (c) a mouthpiece at the front of said housing in communication with said air chambers
   (d) cap means covering the aft end of one of said air chambers for providing a fixed volume air chamber
   (e) means movably positioned in the aft portion of said other air chamber for selectively changing the volume of air therein, to provide a variable volume air chamber, and
   (f) vent openings in the top of said housing adjacent the mouthpiece and in communication with said constant volume air chamber and variable volume air chamber respectively, which vent openings are closed and opened by finger contact to selectively control the sound emitted from the air chambers.

2. A game call or the like whistle as in claim 1 and wherein:
   (a) said variable volume air chamber having inserted therein a means for extending the length of said variable volume air chamber to a length greater than that of said constant volume air chamber wherein said extending means is a hollow barrel with an outside diameter substantially the size of said variable volume air chamber, and
   (b) said barrel having inserted therein a means for changing the volume of said variable volume air chamber.

3. A game call or the like whistle as in claim 1 and wherein:
   (a) said means is a piston arm having a top and a bottom,
   (b) said bottom being substantially the size of said barrel, and
   (c) said top having grasping means attached thereto.

4. A game call or the like whistle as in claim 2 and wherein:
   (a) said barrel having positioning means for holding said barrel in proper relationship with said variable volume air chamber.

5. A game call or the like whistle as in claim 4 and wherein:
   (a) said positioning means on said barrel is a collar around said barrel.

6. A game call or the like whistle as in claim 2 and wherein:
   (a) said variable volume air chamber having a stop means for preventing said barrel from being too deeply inserted into said variable volume air chamber.

7. A game call or the like whistle as in claim 6 and wherein:
   (a) said stop means is a raised lip in said variable volume air chamber.

8. A game call or the like whistle as in claim 3 and wherein:
   (a) said piston arm having flanges directly above said bottom so as to enhance stability and prevent wobble of said piston arm.

9. A game call or the like whistle as in claim 3 and wherein:
   (a) said bottom of said piston arm having attached thereto a sealing means whereby air in said variable volume air chamber is maintained therein.

10. A game call or the like whistle as in claim 9 and wherein:
    (a) said sealing means comprises an O-ring.

11. A game call or the like whistle as in claim 1 and wherein:
    (a) said vent opening are directly forward of said mouthpiece and directly rearward of said air chambers.

12. A game call or the like whistle as in claim 1 and wherein:
    (a) said piston arm having flanges directly above said bottom so as to enhance stability and prevent wobble of said piston arm.

13. A game call or the like whistle as in claim 1 and wherein:

(a) said bottom of said piston arm having attached thereto a sealing means whereby air in said variable volume air chamber is maintained therein.

14. A game call or the like whistle as in claim 13 and wherein:
   (a) said sealing means comprises an O-ring.

15. A game call or the like whistle including:
   (a) a housing of elongated shape
   (b) said housing being formed to provide separate air chambers which extend longitudinally of said housing in side-by-side relationship
   (c) a mouthpiece at the front of said housing in communication with said air chambers
   (d) a cap covering the aft end of one of said air chambers for providing a fixed volume air chamber
   (e) means for extending the length of said other air chamber beyond that of said fixed volume air chamber
   (f) a plunger slidable in said other air chamber
   (g) the inner end of said plunger being provided with sealing means engaged with the periphery of said other air chamber, to provide a selectively variable volume air chamber, and
   (h) two vent openings in said housing adjacent the mouthpiece and in communication with said constant volume air chamber and variable volume air chamber respectively, which vent openings are closed and opened by finger contact to selectively control the sound emitted from the air chambers.

16. A game call or the like whistle as in claim 15 and wherein:
   (a) said vent openings are directly forward of said mouthpiece and directly rearward of said air chambers.

17. The game call or the like whistle of claim 15, wherein:
   (a) said means for extending the length of said other air chamber includes a hollow barrel with an outside diameter substantially the size of said variable volume air chamber
   (b) said plunger being inserted into, and movable longitudinally with respect to said barrel for changing the volume of said variable volume air chamber.

18. A game call or the like whistle as in claim 17 and wherein:
   (a) said plunger is a piston arm having a top and a bottom,
   (b) said bottom being substantially the size of said barrel, and
   (c) said top having grasping means attached thereto.

19. A game call or the like whistle as in claim 17 and wherein:
   (a) said barrel having positioning means for holding said barrel in proper relationship with said variable volume air chamber.

20. A game call or the like whistle as in claim 19 and wherein:
   (a) said positioning means on said barrel is a collar around said barrel.

21. A game call or the like whistle as in claim 17 and wherein:
   (a) said variable volume air chamber having a stop means for preventing said barrel from being too deeply inserted into said variable volume air chamber.

22. A game call or the like whistle as in claim 21 and wherein:
   (a) said stop means is a raised lip in said variable volume air chamber.

* * * * *